Feb. 28, 1933.　　　C. HEILINGER　　　1,899,867

VEGETABLE CUTTING MACHINE

Filed Dec. 21, 1929　　2 Sheets-Sheet 1

Carl Heilinger
INVENTOR

BY Victor J. Evans
ATTORNEY

Feb. 28, 1933. C. HEILINGER 1,899,867
VEGETABLE CUTTING MACHINE
Filed Dec. 21, 1929 2 Sheets-Sheet 2
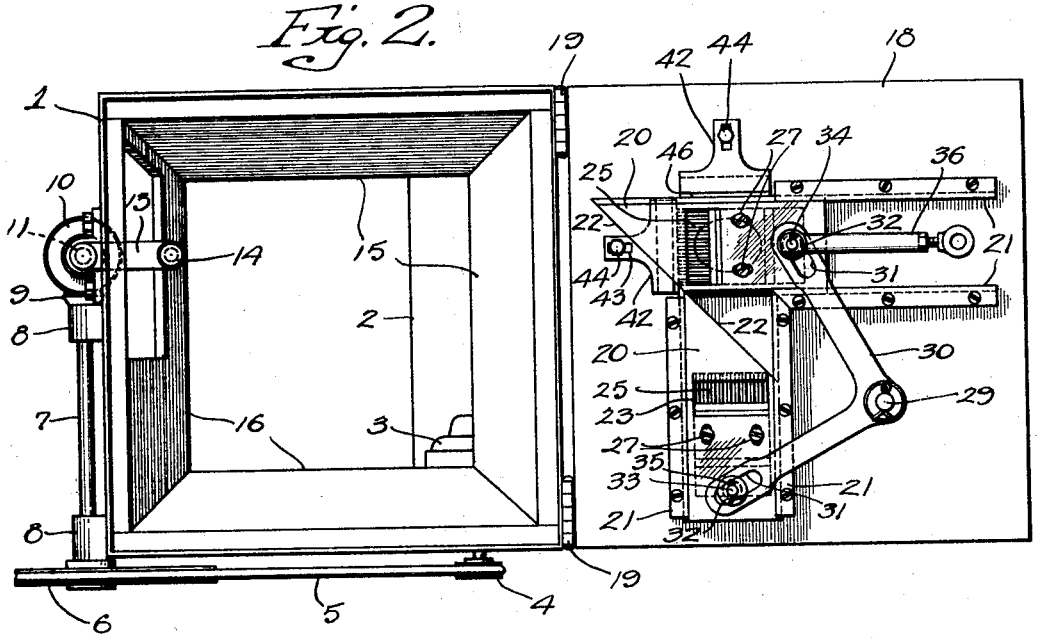
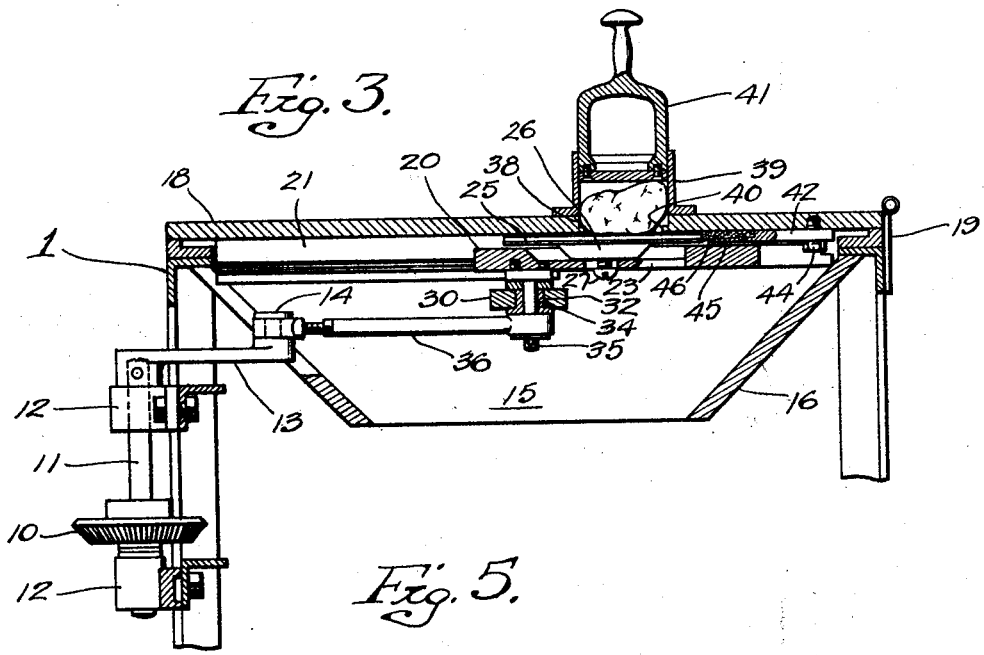
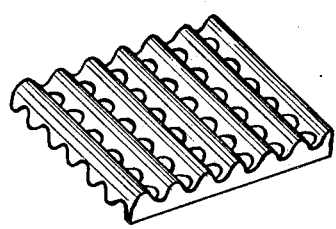
Carl Heilinger:—
INVENTOR
BY Victor J. Evans
ATTORNEY Patented Feb. 28, 1933

1,899,867

UNITED STATES PATENT OFFICE

CARL HEILINGER, OF PHILADELPHIA, PENNSYLVANIA, ASSIGNOR TO TRAINOR FOOD CORPORATION, OF NEW YORK, N. Y., A CORPORATION OF DELAWARE

VEGETABLE CUTTING MACHINE

Application filed December 21, 1929. Serial No. 415,807.

The present invention relates to an improved vegetable cutting machine, involving improvements over the machine disclosed in the United States Letters Patent of January 11, 1916, Patent No. 1,168,203.

While this patent discloses reciprocating cutters one at right angles to the other in simulation to the present type herein disclosed, the present invention has for its aim to provide reversible cutters proper which are carried by reciprocating plates mounted in guides, said plates adapted to be reciprocated, one at right angles to the other, so that when one plate is just completing its return stroke, the other plate operates so that its knife is starting its cutting stroke and vice versa, with means for so imparting such movement to the blades.

Another purpose is to provide a pair of reciprocating plates for carrying the reversible cutting blades, said plates having openings under the blades or cutters through which the sliced vegetable such as potatoes may deposit into a trough, from which the latticed slices of potato can be removed by opening the top of the frame.

Another feature of the invention consists in the provision of a suitable frame having a hinged cover disposed over a trough, the slicing or cutting mechanism being carried by the under surface of the cover, there being a hopper on the top of the cover in register with an opening for the reception of the vegetable, for example one or more potatoes, in conjunction with a gravity member for reception into the hopper to retain the potatoes in contact with the cutting knives as they reciprocate over the opening, the margin of the opening having a shoulder to limit the movement of the gravity member or weight, so that it will not feed through the opening after cutting on the vegetable that might be in the hopper.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:

Figure 2 is a plan view of the machine showing the cover open and more clearly illustrating the operating mechanism for the cutters.

Figure 3 is a vertical sectional view on line 3—3 of Figure 1, the line passing through the hopper, thereby illustrating the vegetable therein and showing the gravity or weight holding the vegetable in position, also illustrating the abutment shoulder.

Figure 5 is a detailed perspective view of a portion of a latticed potato chip.

Figure 1:
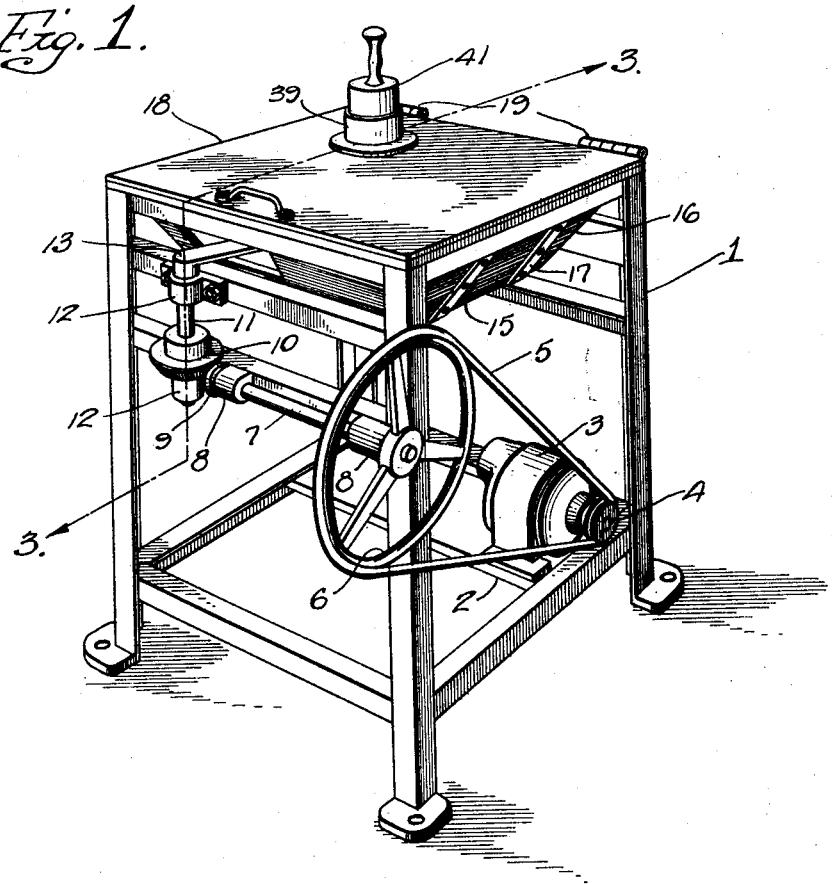
Figure 1 is a view in perspective of the improved vegetable cutting machine constructed in accordance of the invention, a suitable motor being shown on the lower portion of the machine for driving the cutting mechanism.

Referring to the drawings, 1 identifies a frame which may be of any size and shape preferably rectangular and preferably constructed, though not necessarily, of angle iron as illustrated.

The lower part of the frame has a horizontally disposed portion 2 supporting an electric motor 3 provided with a driving pulley 4. This pulley is in turn operatively connected by a belt 5 to a larger pulley 6, which is mounted upon the shaft 7 near the top of the machine. The shaft 7 is mounted in suitable bearings 8, and one end has a beveled pinion 9, which in turn meshes with a beveled gear 10 mounted upon a shaft 11 positioned in bearings 12, which are carried by the upper part of the frame of the machine. The upper end of the shaft 11 carries a crank arm 13 provided with a fulcrumed pin 14.

As previously stated the frame of the machine is rectangular, and depending from the top portion thereof is a trough 15 of a size and shape in transverse area in accordance with the shape of the transverse area of the frame.

Figure 4:
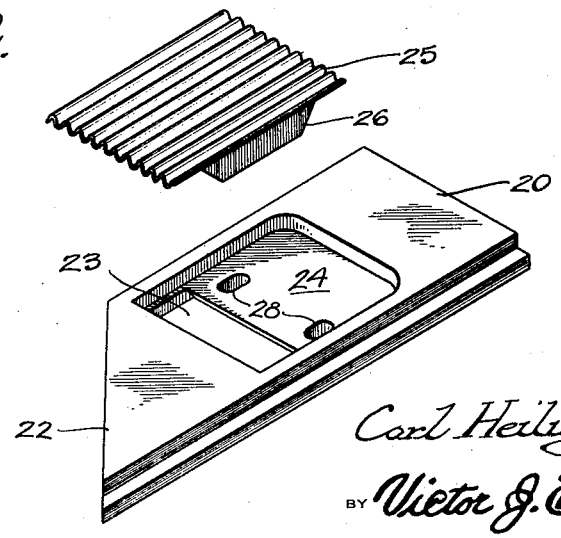
Figure 4 is an enlarged detail view of one of the vegetable plates showing the cutting knives and illustrating the latter as disconnected from the plate, more clearly showing how they can be assembled.

However this trough comprises the downwardly and inwardly inclined side pieces 16 to which the metallic transverse straps 17 are secured for supporting the trough in position, said straps being connected to the side upper rails of the frame. A cover 18 is hinged at 19 to the frame in order to close the trough, and mounted on the under face of the cover are slide plates 20, mounted in guides 21. These slide plates are disposed at right angles to each other, therefore are provided with inclined adjacent engaging edges 22. The slide plates have openings 23 and adjoining depressions 24. Cutting blades 25 overlie the openings and have centrally located thickened or heavy portions 26, which engage in the depressions, to insure holding the cutting plates or knives rigid. Screws 27 engage through the slide plates, slots 28 being provided for the screws, which are threaded into the thickened or heavy body portions of the blades, to hold the blades in position. The slots in the slide plates are for the purpose of permitting the blades to be adjusted. As shown in Figure 4 the blades are reversible, that is end for end, allowing either cutting edge to be used. The blades or cutters are fluted in cross-sectional area, and due to the fact that the blades operate at right angles to each other latticed slices of vegetable, such as potato, may be cut. In other words the slices of potato are perforated as shown in Figure 5.

Pivoted at 29 to the under surface of the cover is a bell crank lever 30, the slots 31 in its arms engage with rollers 32, which are mounted upon the pivot pins 33 and 34 of the slide plates, there being retaining or cotter pins 35 to hold the arms of the bell crank connected with the rollers.

However connected to the pivot pin 34 is a link 36, which is in turn pivoted on the pin 14 of the crank arm 13 carried by the shaft 11. One side of the trough is cut away to permit of the passage of the link 36.

Obviously when the motor is started motion is transmitted to the shaft 11 and thence to the bell crank lever 30 through the medium of the link 36, consequently reciprocating movements are imparted to the slide plates.

As one slide plate moves over an opening 38 in the cover, the other slide plate moves from under the opening and vice versa, and as these slide plates operate the cutters or knives will act to cut slices of such vegetable as may be placed in the opening 38.

A hopper 39 engages over the opening 38 and in register therewith, the hopper and the opening being of the same shape preferably elliptical, more or less conforming to the shape of the general run of potatoes. However other vegetables than potatoes may be placed in the hopper, and furthermore the hopper may be any size, while the cutters or knives may correspond in proportion. The lower portion of the margin of the opening 38 has an abutment shoulder 40, with which the lower marginal corner of a gravity member or weight 41 may engage, for the purpose of limiting the downward movement of the weight, that is after completing the cutting of the vegetable. The cover is provided with a handle as shown in Figure 1, so that the cover may be opened with it if desired to remove the cut vegetable from the trough.

Mounted on the under surface of the cover in a position in order to be in the path of the cutting edges or knives are abutment plates 42, which are slotted at 43 for the reception of screws 44, for holding the abutment plates in different positions. The under surfaces of the abutment plates are recessed, and secured in said recesses 45 are abutments 46. These abutments may be constructed of any suitable material, preferably rubber composition or the like, and with which the cutting edges of the knives or cutters engage in order to insure a complete cut of the vegetable. These abutments for the cutting edges of the knives are not to be too soft or too hard, just of a character that will not dull the cutting edges of the cutters to any great or appreciable degree.

The invention having been set forth, what is claimed is:

A vegetable slicing machine, comprising a pair of reciprocal slide plates mounted to move at right angles in relation to each other, means comprising an opening in a cover and over which opening the slide plates are adapted to move alternately, cutting blades on the slide plates to move over the opening, a hopper engaged over and in register with the opening for the reception of the vegetable, a gravity member engaged in the hopper and resting upon the vegetable to hold it in position adjacent the slide plates, and means for operating the plates to cause the blades to alternately advance through the vegetable, said plates having adjacent engaging inclined edges for regulating the moving relation of the foregoing elements, said opening having a marginal abutment shoulder with which the gravity member engages to limit its downward movement after completing the cutting of the vegetable, and manually set abutments, with which the cutting edges of the blades may abut to insure a complete cut through the vegetable, said blades having cutting edges at both ends and being reversibly mounted on the slide plates.

In testimony whereof he affixes his signature.

CARL HEILINGER.